(12) United States Patent
Adachi

(10) Patent No.: US 9,198,456 B2
(45) Date of Patent: Dec. 1, 2015

(54) APPARATUS AND METHOD FOR HEATING AND STERILIZING LIQUID FOOD

(75) Inventor: Yoshio Adachi, Tokyo (JP)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 39 days.

(21) Appl. No.: 14/004,709

(22) PCT Filed: Mar. 11, 2012

(86) PCT No.: PCT/JP2012/056207
§ 371 (c)(1),
(2), (4) Date: Nov. 12, 2013

(87) PCT Pub. No.: WO2012/124644
PCT Pub. Date: Sep. 20, 2012

(65) Prior Publication Data
US 2014/0057036 A1  Feb. 27, 2014

(30) Foreign Application Priority Data

Mar. 13, 2011 (JP) .................. 2011-054882
Dec. 18, 2011 (JP) .................. 2011-276549

(51) Int. Cl.
*A01J 11/00* (2006.01)
*F16K 49/00* (2006.01)
*A23L 3/22* (2006.01)
*A23C 3/033* (2006.01)
*A23L 2/46* (2006.01)

(52) U.S. Cl.
CPC . *A23L 3/22* (2013.01); *A23C 3/033* (2013.01); *A23L 2/46* (2013.01)

(58) Field of Classification Search
CPC .............. A61L 2/00; A23L 3/00; A23C 3/00; C12H 1/00
USPC .............................. 422/307; 99/452; 137/334
See application file for complete search history.

(56) References Cited

U.S. PATENT DOCUMENTS

| | | | | |
|---|---|---|---|---|
| 4,583,453 | A * | 4/1986 | Torterotot | ...................... 99/455 |
| 2008/0020110 | A1 | 1/2008 | Dock | |
| 2011/0030918 | A1 | 2/2011 | Feilner | |

FOREIGN PATENT DOCUMENTS

| | | |
|---|---|---|
| EP | 0 323 654 A1 | 7/1989 |
| EP | 1 886 574 A1 | 2/2008 |
| EP | 2 281 467 A2 | 2/2011 |
| GB | 1 347 415 A | 2/1974 |
| GB | 2 137 070 A | 10/1984 |

(Continued)

OTHER PUBLICATIONS

International Search Report issued by the Japanese Patent Office in corresponding International Application No. PCT/JP/2012/056207.

(Continued)

*Primary Examiner* — Monzer R Chorbaji
(74) *Attorney, Agent, or Firm* — Finnegan, Henderson, Farabow, Garrett & Dunner, L.L.P.

(57) ABSTRACT

An apparatus and a method for heating and sterilizing liquid food, which may avoid the food product damage caused by direct contact with a hot heating medium, and reduce the time required for heat exchange, and the time for which the food product is kept in the high temperature zone. The apparatus and the method may also reduce the damage to the quality of the food product due to the high temperature.

3 Claims, 2 Drawing Sheets

(56) References Cited

FOREIGN PATENT DOCUMENTS

| | | |
|---|---|---|
| JP | 01-257451 | 10/1989 |
| JP | 05-292925 | 11/1993 |
| JP | 11-103834 | 4/1999 |

OTHER PUBLICATIONS

Extended European Search Report, dated Feb. 19, 2015, issued by European Patent Office in counterpart European Application No. 12757588.4.

* cited by examiner

APPARATUS AND METHOD FOR HEATING AND STERILIZING LIQUID FOOD

CROSS-REFERENCE TO RELATED APPLICATIONS

This is a U.S. National Phase Application of International Application No. PCT/JP2012/056207, filed Mar. 11, 2012, which claims the benefit of priority to Japanese Patent Application No, 2011-054882, filed Mar. 13, 2011, and Japanese Patent Application No. 2011-276549, filed Dec. 18, 2011, which are incorporated herein by reference.

FIELD OF THE INVENTION

The present invention relates to an apparatus and a method for heating and sterilizing liquid food in a system manufacturing the liquid food, such as from-concentrate beverages.

BACKGROUND ART

The liquid foods, for example, processed milk products, fruit juice/vegetable juice, mineral water, the other beverages, soup, sauce, tomato paste, custard dessert, fruit processed goods, vegetable puree, baby food, and from concentrate beverages with high viscosity are pasteurized or sterilized by heat treatment etc. in manufacturing processes.

In the heat treatment for sterilization/pasteurization, there are direct sterilization by, for example, blowing steam or flame of high temperature into the food product directly and indirect sterilization by charging a heat exchanger with the food product and heating the food product with heating medium via the exchanger walls.

The heat exchangers used for the indirect sterilization include a plate type apparatus (See Patent document 1) with plate-like walls, and a pipe type apparatus with tubular walls, and they are used according to their uses.

PRIOR ART DOCUMENT

Patent Documents

Patent documents 1 JP 11-103834, A

SUMMARY OF THE INVENTION

Problem to be Solved by the Invention

Since the high temperature steam is blown into the liquid food directly in the direct pasteurization, there is a risk that the food product having touch on the hot heating medium may suffer the damage, for example, may suffer the burnt smell. On the other hand, the risk of the above-mentioned direct pasteurization can be reduced in the indirect pasteurization with the comparatively wide touch surface. Usually, the liquid food sensitive to heat is heat-treated by the indirect pasteurization.

In the system manufacturing the from-concentrate beverages and the from-concentrate liquid food, the condensed beverages and the liquid food, for example, the fruit juice drink is diluted with the dilution water of 500% volume to predetermined concentration, and the volume increases to 600%. Since the volume increases by the 6 times as compared with the volume of the liquid food before the dilution, in the heat-sterilizing and the heat recovery/cooling with the heat exchanger by the indirect pasteurization, at a rough estimate, 6 times as much input energy is required. Since the volume increases to 6 times, the time required in the heating and cooling of the heat exchange gets longer, and the time for which the food product is kept at the high temperature zone gets longer. Therefore, there is the risk that the damage (heat load against the product) to the quality of the food product due to the high temperature also gets larger.

The present invention meets to the above-mentioned necessity and longing. The object is to provide an apparatus and a method for heating and sterilizing liquid food allowing the food product damage caused by direct contact with a hot heating medium is avoided, the time required for heat exchange is shorten, the time for which the food product is kept in the high temperature zone is shorten, and damage to the quality of the food product due to the high temperature is reduced.

Means for Solving the Problem

An apparatus for heating and sterilizing liquid food of the present invention which solves the above-mentioned problem is characterized by comprising a liquid food pump which sends out concentrated liquid food before being processed, a coil-type tubular heat exchanger for heating provided with an inlet, an outlet, and a flow path formed from a tubular exchange wall which has fluid-tight passes between the inlet and the outlet, a heat exchanger for cooling provided with an inlet, an outlet, and a flow path formed from an exchange wall which has fluid-tight passes between the inlet and the outlet, a prepared liquid food reservoir tank for temporarily storing the cooled and from-concentrate liquid food, a dilution water pump for sending out cooling dilution water disinfected/sterilized, a first flow path for creating fluid-tight communication between the outlet of the liquid food pump and the inlet of the heat exchanger for heating, a second flow path for creating fluid-tight communication between the outlet of the heat exchanger for heating and the inlet of the heat exchanger for cooling, a third flow path for creating fluid-tight communication between the outlet of the heat exchanger for cooling and the inlet of the reservoir tank, and a fourth flow path for creating fluid-tight communication between the outlet of the dilution water pump and a junction of the second flow path.

In the preferable embodiment of this invention, the heat exchanger for cooling is a coil-type tubular heat exchanger provided with the flow path formed from a tubular exchange wall, In the preferable embodiment of this invention, a fifth flow path for creating fluid-tight communication between the outlet of the dilution water pump and a junction of the first flow path is provided.

A method for heating and sterilizing liquid food of the present invention which solves the above-mentioned problem is characterized by comprising the following steps:

a step for preparing the concentrated liquid food before being processed, and the cooling dilution water disinfected/sterilized, a step for feeding the concentrated liquid food into the liquid food pump to send out it from the outlet, a step for fluid-tightly passing the concentrated liquid food from the outlet of the liquid food pump to the inlet of the heat exchanger for heating via the first flow path, a step for feeding the concentrated liquid food from the inlet of the coil-type tubular heat exchanger for heating, and fluid-tightly passing and heating it via the inside of the flow path formed from a tubular exchange wall between the inlet and the outlet, a step for fluid-tightly passing the heated concentrated liquid food from the outlet of the heat exchanger for heating to the inlet of the heat exchanger for cooling via the second flow path, a step for sending out the cooling dilution water disinfected/sterilized via the dilution water pump, a step for fluid-tightly passing the cooling dilution water from the outlet of the dilution water pump to the junction of the second flow path via the fourth flow path, a step for feeding the liquid food from the inlet of the heat exchanger for cooling, fluid-tightly passing and cooling it via the inside of the flow path formed from an exchange wall between the inlet and the outlet, a step for fluid-tightly passing the cooled liquid food from the outlet of the heat exchanger for cooling to the inlet of the reservoir tank via the third flow path, and a step for temporarily storing the cooled and from-concentrate liquid food in the prepared liquid food reservoir tank.

In the preferable embodiment of this invention, the heat exchanger for cooling is a coil-type tubular heat exchanger for heating provided with the flow path formed from a tubular exchange wall.

In the preferable embodiment of this invention, a step for fluid-tightly passing the cooling dilution water from the outlet of the dilution water pump to the junction of the first flow path via the fifth flow path is comprised.

Effect of the Invention

According to the present invention of the above-mentioned structure, the following effects and functions are shown and the advantageous effect is acquired.

In the heating and sterilizing for the liquid food of the present invention, the concentrated liquid food before being processed, and the cooling dilution water disinfected/sterilized are prepared first.

The liquid food includes processed milk products, small pieces and pulp-containing fruit juice/vegetable juice, mineral water, soup, sauce, tomato paste, custard dessert, fruit processed products, vegetable puree, the baby food, etc. In this invention, the concentrate is the liquid food having moisture ratio lower than moisture ratio of the food when it is consumed as a food.

The cooling dilution water disinfected/sterilized is the water obtained by filtration disinfection, for example, the disinfection film to water-treated tap water, well water, spring water, etc., or the water obtained by UV pasteurization to the treated water.

Preparing the concentrated liquid food and the cooling dilution water can promote to the steps of the heating and sterilizing for the liquid food.

In the heating and sterilizing of the present invention, the concentrated liquid food is fed into the liquid food pump, and is sent out from the outlet.

With, for example, the predetermined discharge pressure, the liquid food pump can quantitatively feed the concentrated liquid food in the heating-and-sterilizing system for the heat treatment, In the heating and sterilizing of the present invention, the concentrated liquid food is fluid-tightly passed from the outlet of the liquid food pump to the inlet of the heat exchanger for heating via the first flow path.

For example, the concentrated liquid food can be quantitatively and fluid-tightly conveyed to the heat exchanger for heating with the discharge pressure of the liquid food pump.

In the heating and sterilizing of the present invention, the concentrated liquid food is fed from the inlet of the coil-type tubular heat exchanger for heating, and is fluid-tightly passed and heated via the inside of the flow path formed from the tubular exchange wall between the inlet and the outlet.

In the heat exchanger of indirect heating, the exchange wall is inserted between the heat (cooling) medium and the product to be heat-processed (liquid food), and they deliver and receive thermal energy. In this invention, while the liquid food moves from the inlet of the tubular exchange wall having spiral shape to the outlet, the liquid food can be heated.

Because of the indirect heating, the food product damage due to being in contact with the hot heating medium directly is avoidable.

When the shape of the exchange wall is spiral and tubular, even the food product with high viscosity and the solid-containing food product can move smoothly without any blocking and any adhering to the container wall and can be heat-treated uniformly.

In the heating and sterilizing of the present invention, the heated concentrated liquid food is fluid-tightly passed from the outlet of the heat exchanger for heating to the inlet of the heat exchanger for cooling via the second flow path.

The heated concentrated liquid food can be fluid-tightly conveyed to the heat exchanger for cooling with the discharge pressure of the liquid food pump.

In the heating and sterilizing of the present invention, the cooling dilution water disinfected/sterilized is sent out via the dilution water pump, and the cooling dilution water is fluid-tightly passed from the outlet of the dilution water pump to the junction of the second flow path via the fourth flow path.

The cooling dilution water can be fluid-tightly conveyed to the junction of the second flow path via the fourth flow path with the discharge pressure of the dilution water pump. In the junction of the second flow path, the cooling dilution water is mixed with the heated concentration liquid food through the second flow path, and the food can be directly cooled by the mixing.

According to the direct cooling, the time required for the heat exchange can be shortened, the time for which the food product is kept in the high temperature zone can also be shortened, and the damage to the quality of the food product due to the high temperature can be reduced.

In the heating and sterilizing of the present invention, the liquid food is fed from the inlet of the heat exchanger for cooling, is fluid-tightly passed and cooled via the inside of the flow path formed from an exchange wall between the inlet and the outlet.

In the heat exchanger of indirect heating, the exchange wall is inserted between the cooling medium and the product to be heat-processed (liquid food), and they deliver and receive thermal energy. In the preferable embodiment of this invention, while the liquid food moves from the inlet of the tubular exchange wall having spiral shape to the outlet, the liquid food can be cooled.

Although the cooling dilution water and the liquid food are mixed and it is cooled nearly by the mixing at the previous step, the heat exchanger for cooling can still more finely control, and can perform predetermined cooling.

In the preferable embodiment, when the shape of the exchange wall is spiral and tubular, even the food product with high viscosity and the solid-containing food product can move smoothly without any blocking and any adhering to the container wall and can be heat-treated uniformly.

In the heating and sterilizing of the present invention, the cooled liquid food is fluid-tightly passed from the outlet of the heat exchanger for cooling to the inlet of the reservoir tank via the third flow path, and the cooled and from-concentrate liquid food is temporarily stored in the prepared liquid food reservoir tank.

The predetermined temperature-cooled liquid food having predetermined concentration can be temporarily stored in the prepared liquid food reservoir tank (product tank), and can make the preparation for filling to containers.

In the preferable embodiment of the heating and sterilizing of the present invention, the cooling dilution water is fluid-tightly passed from the outlet of the dilution water pump to the junction of the first flow path via the fifth flow path.

In the heating and sterilizing of the present invention, in the process of fluid-tightly conveying the concentrated liquid food to the heat exchanger for heating with the discharge pressure of the liquid food pump via the first flow path, partial dilution can be carried out to reduce viscosity.

BEST MODE FOR CARRYING OUT THE INVENTION

Figure 1:
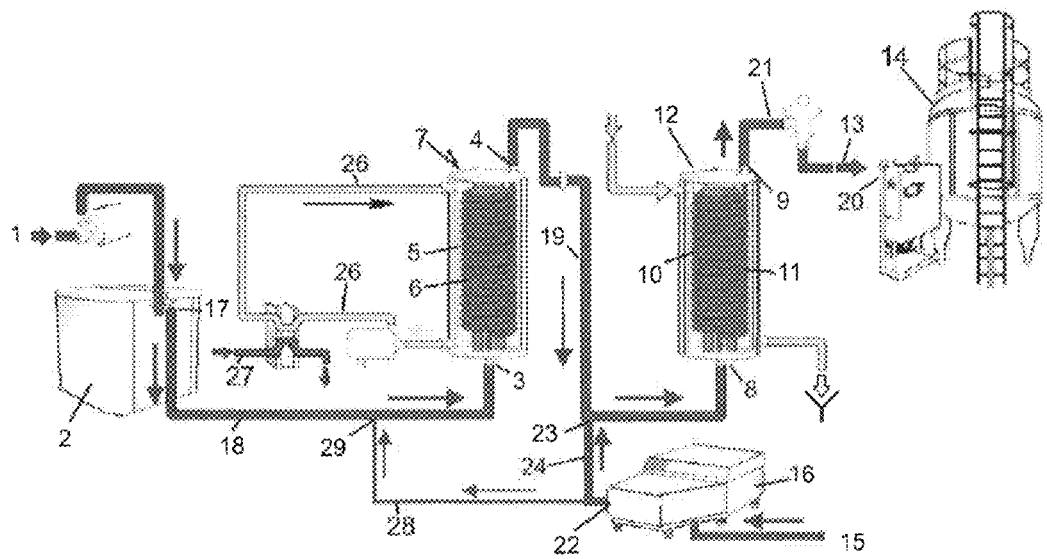
FIG. 1 Schematic diagram showing roughly the apparatus for heating and sterilizing liquid food according to this invention.

Hereinafter, the embodiment of the invention is explained in detail, referring to the drawings.

An apparatus for heating and sterilizing liquid food of the embodiment shown in FIG. 1 has a liquid food pump 2 which sends out a concentrated liquid food 1 before being processed, a coil-type tubular heat exchanger 7 for heating provided with an inlet 3, an outlet 4, and a flow path formed from a tubular exchange wall 5 which has fluid-tight passes between the inlet 3 and the outlet 4, a heat exchanger 12 for cooling provided with an inlet 8, an outlet 9, and a flow path 11 formed from an exchange wall 10 which has fluid-tight passes between the inlet 8 and the outlet 9, a prepared liquid food reservoir tank 14 for temporarily storing the cooled and from-concentrate liquid food 13, a dilution water pump 16 for sending out cooling dilution water 15 disinfected/sterilized, a first flow path 18 for creating fluid-tight communication between the outlet 17 of the liquid food pump and the inlet 3 of the heat exchanger 7 for heating, a second flow path 19 for creating fluid-tight communication between the outlet 4 of the heat exchanger 7 for heating and the inlet 8 of the heat exchanger 12 for cooling, a third flow path 21 for creating fluid-tight communication between the outlet 9 of the heat exchanger 12 for cooling and the inlet 20 of the reservoir tank 14, and a fourth flow path 24 for creating fluid-tight communication between the outlet 22 of the dilution water pump 16 and a junction 23 of the second flow path 19.

The apparatus for heating and sterilizing liquid food of the embodiment shown in FIG. 1 operates as follows.

In the heating and sterilizing for the liquid food of this embodiment, the concentrated liquid food 1 before being processed, and the cooling dilution water 15 disinfected/sterilized are prepared first.

The liquid food of this embodiment has much condensed viscosity or thick solid content. For example, there are coffee, processed milk products, small pieces/pulp-containing fruit juice/vegetable juice, mineral water, soup, sauce, tomato paste, custard dessert, fruit processed products, vegetable puree, the baby food, etc.

The cooling dilution water disinfected/sterilized is the water obtained by filtration disinfection, for example, the disinfection film to water-treated tap water, well water, spring water, etc., or the water obtained by UV pasteurization to the treated water. Although the temperature of cooling dilution water can be changed suitably, it is, for example, 2-3 degrees centigrade.

In the heating and sterilizing of this embodiment, the concentrated liquid food 1 is fed into the liquid food pump 2, and is sent from the outlet 17.

In the predetermined discharge pressure, for example, for predetermined time and by 100 volume, the aseptic metering pump 2 for the liquid food feeds the concentrated liquid food in the heating-and-sterilizing system for heat treatment.

In the heating and sterilizing of this embodiment, the concentrated liquid food 1 is fluid-tightly passed from the outlet 17 of the liquid food pump 2 to the inlet 3 of the heat exchanger 7 for heating via the first flow path 18.

For example, for predetermined time by 100 volume, the concentrated liquid food 1 is fluid-tightly conveyed to the heat exchanger 7 for heating with the discharge pressure of the liquid food pump 2.

In the heating and sterilizing of this embodiment, the concentrated liquid food 1 is fed from the inlet 3 of the coil-type tubular heat exchanger 7 for heating, and is fluid-tightly passed and heated via the inside of the flow path 6 formed from the tubular exchange wall 5 between the inlet 3 and the outlet 4.

In the heat exchanger 7, the exchange wall 5 is inserted between the heat medium 26 and the product to be heat-processed (liquid food 1), and they deliver and receive thermal energy. The liquid food is heated while the liquid food moves from the inlet to the outlet of the spiral an tubular exchange wall 5. In this embodiment, the liquid food 1 is heated at 95.5 degrees centigrade. The recovered heating medium 26 is again heated with the hot steam 27.

Because of the indirect heating, the food product damage due to the directly contact with the hot heating medium is avoided. Since the shape of the exchange wall 5 is spiral and tubular, even the food product with high viscosity and the solid-containing food product moves smoothly without any blocking and any adhering to the container wall and is heat-treated uniformly.

The coil-type tubular heat exchanger for heating which can be used for this embodiment includes an equipment of "Tetra Therm Aseptic Visco" made by Tetra Pak.

In the heating and sterilizing of this embodiment, the heated concentrated liquid food 1 is fluid-tightly passed from the outlet 4 of the heat exchanger 7 for heating to the inlet 8 of the heat exchanger 12 for cooling via the second flow path 19.

The heated concentrated liquid food 1 is fluid-tightly conveyed to the heat exchanger 12 for cooling with the discharge pressure of the liquid food pump.

In the heating and sterilizing of this embodiment, the cooling dilution water 15 disinfected/sterilized is sent out via the dilution water pump 16, and the cooling dilution water 15 is fluid-tightly passed from the outlet 22 of the dilution water pump 16 to the junction 23 of the second flow path 19 via the fourth flow path 24.

The cooling dilution water 15 is fluid-tightly conveyed to the junction 23 of the second flow path 19 via the fourth flow path 24 with the discharge pressure of the dilution water pump 16. In the junction 23 of the second flow path, the cooling dilution water 15 is mixed with the heated concentrated liquid food 1 through the second flow path 19, and the food is directly cooled by the mixing.

The temperature of the cooling dilution water 15 is 2-3 degrees centigrade in this embodiment. The temperature of the liquid food 1 is 95.5 degrees centigrade. The volume of the cooling dilution water 15 is 400 volume for predetermined time, and the volume of the liquid food 1 is 100 volume for predetermined time as mentioned above.

Therefore, the volume after mixing is 500 (=100+400), and the temperature reaches 20 degrees centigrade.

The time required for the heat exchange is shortened by the direct cooling, the time for which the food product is kept in the high temperature zone is also shortened, and the damage to the quality of the food product due to the high temperature is reduced.

In the heating and sterilizing of this embodiment, the liquid food 1 is fed from the inlet 8 of the heat exchanger 12 for cooling, is fluid-tightly passed and cooled via the inside of the flow path formed from an exchange wall 10 between the inlet 8 and the outlet 9.

In the heat exchanger 12, the exchange wall 10 is inserted between the cooling medium and the product to be heat-processed (liquid food 1), and they deliver and receive thermal energy. In this embodiment, while the liquid food moves from the inlet of the tubular exchange wall having spiral shape to the outlet, the liquid food is cooled.

At the junction 23 of the previous step, the low-temperature cooling dilution water 15 and the hot liquid food 1 are mixed, and the food is cooled nearly by the mixing. The heat exchanger 12 for cooling still more finely controls, and performs the predetermined cooling.

In the heating and sterilizing of this embodiment, the cooled liquid food 1 is fluid-tightly passed from the outlet 9 of the heat exchanger 12 for cooling to the inlet 20 of the reservoir tank 14 via the third flow path 21, and the cooled and from-concentrate liquid food 1 is temporarily stored in the prepared liquid food reservoir tank.

The predetermined temperature-cooled liquid food having predetermined concentration is temporarily stored in the prepared liquid food reservoir tank (product tank), and it makes the preparation for filling to containers.

In the embodiment of the heating and sterilizing of this embodiment, the cooling dilution water is fluid-tightly passed from the outlet 22 of the dilution water pump 16 to the junction 29 of the first flow path 18 via the fifth flow path 28.

In the heating and sterilizing of this embodiment, in the process of fluid-tightly conveying the concentrated liquid food 1 to the heat exchanger 7 for heating with the discharge pressure of the liquid food pump via the first flow path 18, partial dilution is carried out to reduce the viscosity.

Figure 2:
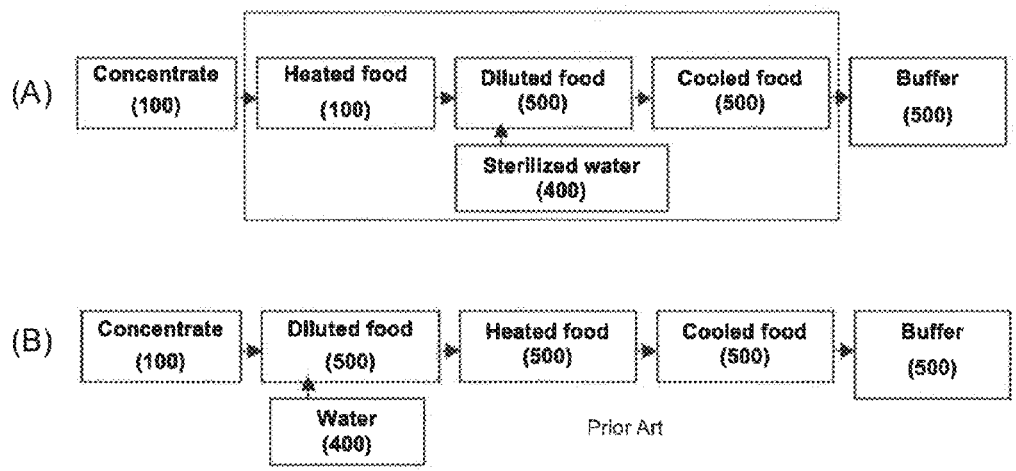
FIG. 2 Outline process charts showing roughly the steps of the method for heating and sterilizing liquid food (A) of Example according to this invention and a method (B) of a comparative example.

FIG. 2 of the outline process charts shows roughly the steps of the method for heating and sterilizing liquid food (A) of Example and the method (B) of the comparative example.

In Example, the concentrated liquid food of 100 volume, and disinfected/sterilized water of 400 volume for cooling dilution are prepared. The concentrated liquid food of 100 volume is heated by the coil-type tubular heat exchanger for heating. The heated concentrated liquid food of 100 volume is diluted with disinfected/sterilized water of 400 volume for cooling dilution. The diluted liquid food of 500 volume is cooled. The cooled and from-concentrate liquid food is temporarily stored as a buffer. In the comparative example, the unprocessed, concentrated liquid food of 100 volume is diluted with water for dilution of 400 volume. The diluted liquid food of 500 volume is heated with the heat exchanger for heating. The heated from-concentrate liquid food of 500 volume is cooled. The cooled from-concentrate liquid food of 500 volume is temporarily stored as a buffer.

In the comparative example, since the large volume (500 volume) is heated and cooled, the liquid food is exposed to heat for the long time, and heat load is high. There is a risk that the bad influence may be carried out to quality, for example, the off-flavor may be emanated because of high heat load.

In Example, since the concentrated liquid food is heated only, the heat load is low and the energy required with heating is low, Because of the quick heating and the quick cooling, the heat load is low and the high quality can be kept.

Figure 3:
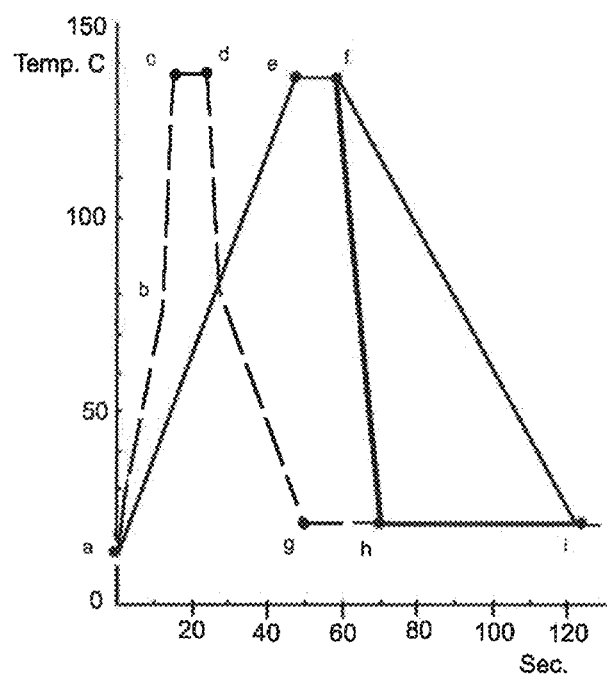
FIG. 3 Diagram showing the heat history (relation of time-product temperature) of the product roughly according to the method for heating and sterilizing liquid food of Example according to this invention, the direct heat-sterilizing method, and a conventional indirect heating sterilization.

FIG. 3 shows roughly the heat history (relation of time-product temperature) of Example, the comparative example and the direct heat-sterilizing method. In the method for heating and sterilizing liquid food of Example, as shown in FIG. 3, the heat history (relation of time-product temperature) of a-e-f-h-i is shown. As shown in FIG. 3, in the directly heat-sterilizing method, the heat history (relation of time-product temperature) of a-b-c-d-g-h-i is shown.

In the indirect heating sterilization of the conventionally comparative example, as shown in FIG. 3, the heat history (relation of time-product temperature) of a-e-f-i is shown. By the direct heating-and-sterilizing method, the heat history is short as illustrated. In the conventional indirect heating sterilizing method, since the heat exchanger performs the heat recovery/cooling, the cooling takes time and the heat history is long.

In the indirect heating sterilizing method according to this invention, because of direct cooling with the sterilizing water after heating, the heat history can be shortened compared with the conventional indirect heating sterilizing method. There is no food product damage due to the direct contact in the hot heating medium by the direct heat-sterilizing method.

The present invention is not limited to the embodiment, and it is possible to make it deform variously based on the object of the present invention, and it does not eliminate them from the scope of the present invention.

INDUSTRIAL APPLICABILITY

This invention is applicable to manufacturing of the liquid food.

DENOTATION OF REFERENCE NUMERALS

1 . . . Liquid Food
2 . . . Liquid Food Pump
3 . . . Inlet
4 . . . Outlet
5 . . . Tubular Exchange Wall
6 . . . Row Path
7 . . . Coil-type Tubular Heat Exchanger for Heating
8 . . . Inlet
12 . . . Heat Exchanger for Cooling
13 . . . Liquid food
14 . . . Prepared Liquid Food Reservoir Tank
15 . . . Cooling Dilution Water
16 . . . Dilution Water Pump
17 . . . Junction

The invention claimed is:

1. An apparatus for heating and sterilizing liquid food characterized by comprising:
   a liquid food pump which sends out concentrated liquid food before being processed;
   a coil-type tubular heat exchanger for heating provided with an inlet, an outlet, and a flow path formed from a tubular exchange wall which has fluid-tight passes between the inlet and the outlet;
   a heat exchanger for cooling provided with an inlet, an outlet, and a flow path formed from an exchange wall which has fluid-tight passes between the inlet and the outlet;
   a prepared liquid food reservoir tank for temporarily storing cooled and from-concentrate liquid food;
   a dilution water pump for sending out cooling dilution water;
   a first flow path for creating fluid-tight communication between the outlet of the liquid food pump and the inlet of the heat exchanger for heating;
   a second flow path for creating fluid-tight communication between the outlet of the heat exchanger for heating and the inlet of the heat exchanger for cooling;
   a third flow path for creating fluid-tight communication between the outlet of the heat exchanger for cooling and the inlet of the reservoir tank; and
   a fourth flow path for creating fluid-tight communication between the outlet of the dilution water pump and a junction of the second flow path,
   wherein the cooling dilution water from the dilution water pump is supplied to the junction of the second flow path through the fourth flow path.

2. The apparatus for heating and sterilizing liquid food according to claim 1, in which the heat exchanger for heating is a coil-type tubular heat exchanger.

3. The apparatus for heating and sterilizing liquid food according to claim 1, in which a fifth flow path for creating fluid-tight communication between the outlet of the dilution water pump and a junction of the first flow path is provided.

* * * * *